(12) United States Patent
Schulte

(10) Patent No.: US 12,135,387 B2
(45) Date of Patent: Nov. 5, 2024

(54) RADAR DEVICE WITH A SHIELD

(71) Applicant: Hella GmbH & Co. KGaA, Lippstadt (DE)

(72) Inventor: Michael Schulte, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 350 days.

(21) Appl. No.: 16/334,612

(22) PCT Filed: Oct. 9, 2017

(86) PCT No.: PCT/EP2017/075665
§ 371 (c)(1),
(2) Date: Mar. 19, 2019

(87) PCT Pub. No.: WO2018/069244
PCT Pub. Date: Apr. 19, 2018

(65) Prior Publication Data
US 2021/0293919 A1  Sep. 23, 2021

(30) Foreign Application Priority Data
Oct. 13, 2016 (DE) .................... 10 2016 119 545.6

(51) Int. Cl.
*G01S 7/02* (2006.01)
*G01S 7/03* (2006.01)
(Continued)

(52) U.S. Cl.
CPC ............. *G01S 7/028* (2021.05); *G01S 7/032* (2013.01); *H01Q 1/42* (2013.01); *H01Q 17/00* (2013.01)

(58) Field of Classification Search
CPC ........... G01S 7/028; G01S 7/032; H01Q 1/42; H01Q 17/00; H01Q 23/00; H01Q 13/931
See application file for complete search history.

(56) References Cited

U.S. PATENT DOCUMENTS 4,831,498 A * 5/1989 Baba .................. H05K 9/0033
361/752
6,501,415 B1 * 12/2002 Viana .................. H01Q 1/3283
342/195
(Continued)

FOREIGN PATENT DOCUMENTS

DE    9320825 U1    4/1995
DE    102007042173 A1 *  3/2009  ............. G01S 7/032
(Continued)

OTHER PUBLICATIONS

DE102013104147A1_Description_translate.pdf—translation of DE-102013104147-A1 (Year: 2014).*
(Continued)

*Primary Examiner* — Olumide Ajibade Akonai
*Assistant Examiner* — Yonghong Li
(74) *Attorney, Agent, or Firm* — Husch Blackwell LLP

(57) ABSTRACT

A radar device with a housing, with a shield, with an interconnect device, with an electronic circuit arrangement, and with antennas. A circuit arrangement has electronic components, and at least some of the electronic components are arranged on a first side of the interconnect device. The antennas are arranged on a second side of the interconnect device. The shield and the interconnect device, with the components and antennas arranged on it, are surrounded by the housing. The shield has at least one hole, into which at least one of the first components (arranged on the first side of the interconnect device) protrudes, or through which at least one of the components (arranged on the first side of the interconnect device) protrudes. The remaining components (arranged on the first side of the interconnect device), with the exception of connecting elements, are arranged entirely between the first side of the interconnect device and the shield.

11 Claims, 4 Drawing Sheets

(51) Int. Cl.
*H01Q 1/42* (2006.01)
*H01Q 17/00* (2006.01)

(56) References Cited

U.S. PATENT DOCUMENTS

| | | | | |
|---|---|---|---|---|
| 7,488,902 | B2 * | 2/2009 | English | H05K 9/0032 |
| | | | | 174/382 |
| 2006/0152406 | A1 | 7/2006 | Leblanc et al. | |
| 2010/0049261 | A1 * | 2/2010 | Bare | A61N 1/40 |
| | | | | 607/1 |
| 2016/0218420 | A1 * | 7/2016 | Leung | G01S 13/931 |

FOREIGN PATENT DOCUMENTS

| | | | | |
|---|---|---|---|---|
| DE | 102011052363 | A1 | 2/2013 | |
| DE | 102013003916 | A1 | 9/2013 | |
| DE | 102012111184 | A1 | 5/2014 | |
| DE | 102013104147 | A1 * | 10/2014 | G01S 13/931 |
| EP | 2299582 | A1 | 3/2011 | |
| JP | H0794884 | * | 4/1995 | H05K 9/00 |

OTHER PUBLICATIONS

DE_102007042173_A1_I_Descrip.pdf (Year: 2009).*
International Search Report and Written Opinion dated Feb. 7, 2018 from corresponding PCT Application.

* cited by examiner

RADAR DEVICE WITH A SHIELD

CROSS REFERENCE

This application claims priority to PCT Application No. PCT/EP2017/075665, filed Oct. 9, 2017, which itself claims priority to German Patent Application 10 2016 119545.6, filed Oct. 13, 2016, the entirety of both of which are hereby incorporated by reference.

FIELD OF THE INVENTION

The invention concerns a radar device with a multi-piece housing, with a shield, with an interconnect device, with an electronic circuit arrangement and with antennas, where the circuit arrangement bas electronic components, where at least some of the electronic components are arranged on a first side of the interconnect device and the antennas are arranged on a second side of the interconnect device, and where the shield and the interconnect device with the components and antennas arranged on it are surrounded by the housing.

BACKGROUND

A radar device of this type can be found in the document DE 10 2013 104 147 A1. The radar device has a height that is predetermined by its design. At the very least, the housing, the shield, the components of the electronic circuit arrangement and the interconnect device determine the minimum height of the radar device.

For some applications of this type of radar device, however, the height of the radar device has to be reduced so that the radar device can be integrated into its application environment (for example, in a motor vehicle).

Therefore, the invention was based on the problem of proposing a radar device with a reduced height.

SUMMARY OF THE INVENTION

As defined by the invention, this problem is solved by the shield having at least one hole into which at least one of the first components arranged on the first side of the interconnect device protrudes or through which at least one of the components arranged on the first side of the interconnect device protrudes, while the remaining components arranged on the first side of the interconnect device, with the exception of connecting elements, are arranged entirely between the first side of the interconnect device and the shield.

The hole makes it possible to reduce the distance between a side of the shield facing the first side of the interconnect device and the first side of the interconnect device on which components of the circuit arrangement are arranged. Then the first component, whose height exceeds the distance, protrudes into the hole or through the hole. It is possible for multiple first components to protrude into a hole or through a hole. It is also possible for one hole to be provided for each of multiple first components.

It is preferable that the hole or holes have a clear area that corresponds to or is similar to the cross-section of the first component(s).

The first component(s) can at least partially touch the edge of the hole or holes and/or at least partially be at a distance from the edge. The distance can be a maximum of 3 mm; it is typically about 1.5 mm. The distance should be as short as possible so as not to jeopardize the shielding effect of the shield. On the other hand, a circumferential gap should be provided so that the first component(s) can be inserted into the hole(s). This circumferential gap can offset part and position tolerances.

The first component can have a housing made of metal or at least partially made of metal. The metal of the housing of the first component can supplement the shield, which is interrupted by the hole, and thus improve the shielding. It is preferable to have an electrically conducting connection between the metal of the housing of the first component and the shield. The metal of the housing can also be connected to the ground potential of the radar device. It is preferable for this electrically conducting connection to be established through the ground potential of the printed circuit board. The electrically conducting connection between the housing of the first component and the interconnect device can be established through a solder joint with the ground potential of the interconnect device. The electrically conducting connection between the shield and interconnect device can be established by screwing together the interconnect device and the shield.

In the case of an inventive radar device, the circuit arrangement can have multiple first components.

In the case of an inventive radar device, the shield can have multiple holes.

If an inventive radar device has a shield with multiple holes and a circuit arrangement with multiple first components, then each first component can protrude into one of the holes or through one of the holes.

In the case of an inventive radar device, however, it is also possible for some first components to jointly protrude into the hole or into one of the holes of the shield or to protrude through the hole or through one of the holes of the shield.

The first component can be a capacitor, in particular an electrolytic capacitor. If multiple first components are present, at least some of these first components can be capacitors, in particular electrolytic capacitors. If the circuit arrangement includes a monolithic microwave integrated circuit (MMIC), it is advantageous if this is not a first component. On the other hand, an MMIC is advantageous if it is one of the remaining components arranged on the first side of the interconnect device.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
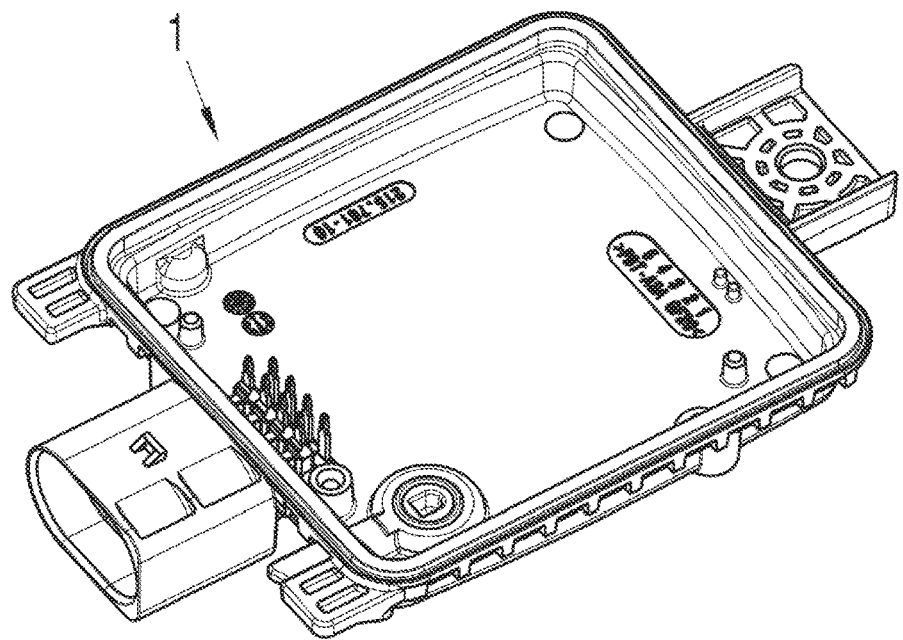
FIG. 1 is a lower part of the housing for an inventive radar device.
Figure 2:
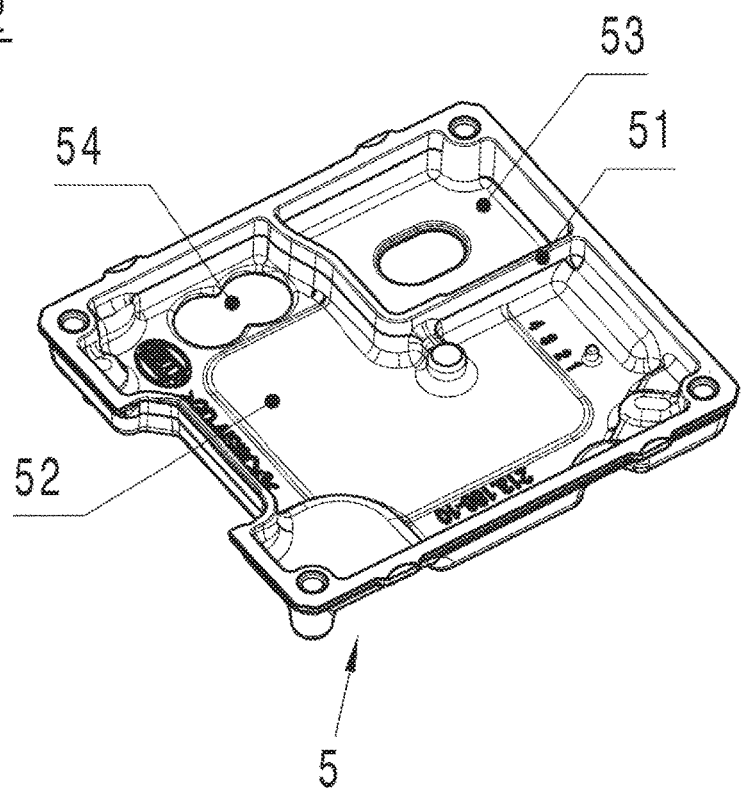
FIG. 2 is a shield for the radar device.
Figure 3:
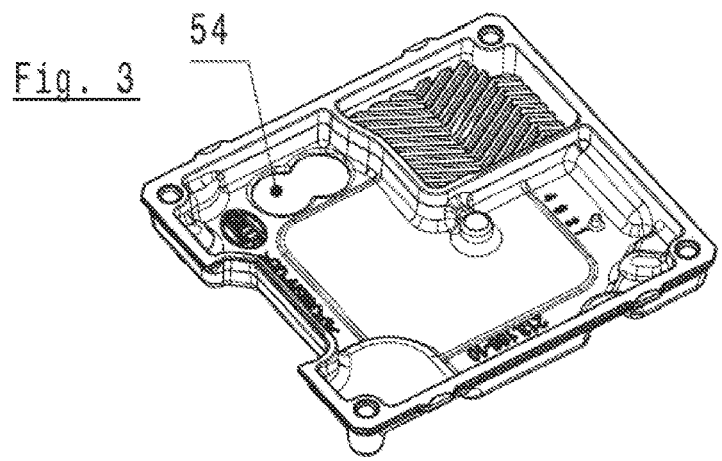
FIG. 3 illustrates the shield and an absorbing body for the radar device.
Figure 4:
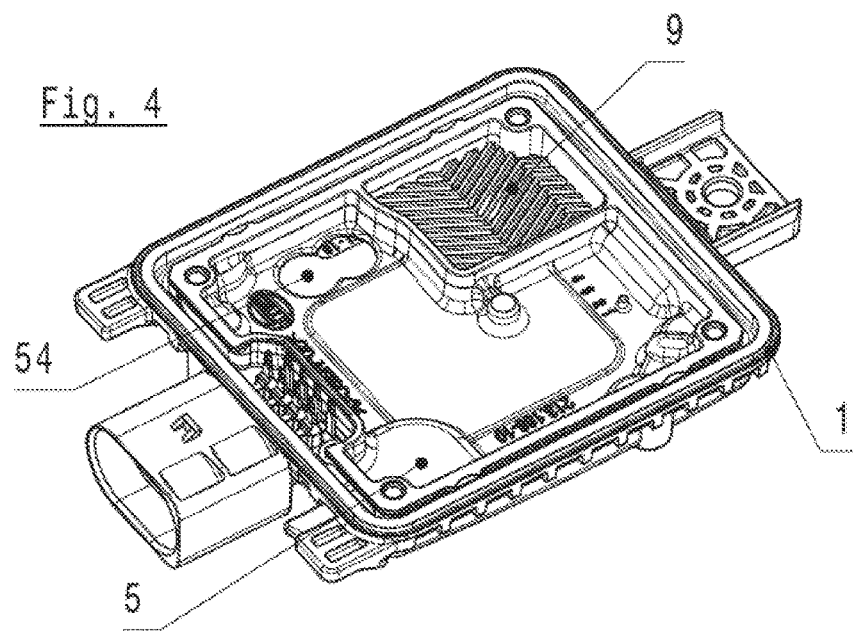
FIG. 4 is the lower part of the housing, the shield and the absorbing body for the radar device.
Figure 5:
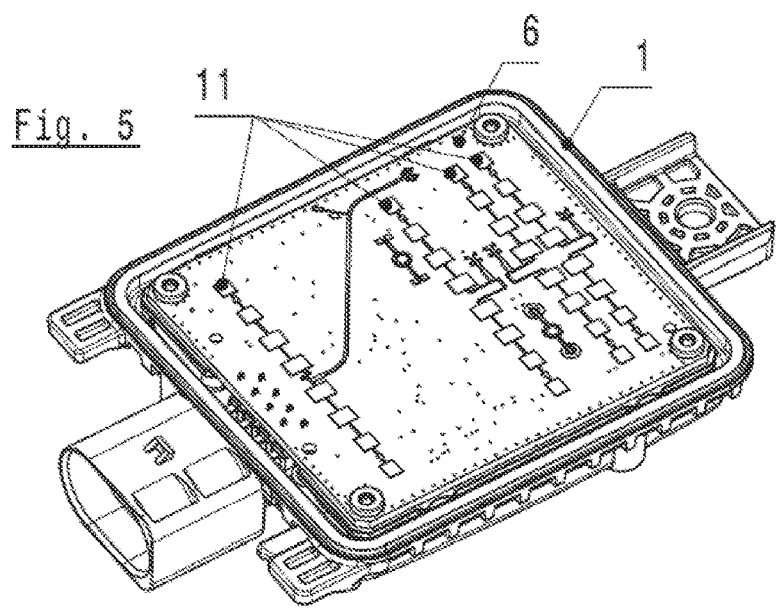
FIG. 5 is the lower part of the housing, the interconnect device and antennas for the radar device.
Figure 6:
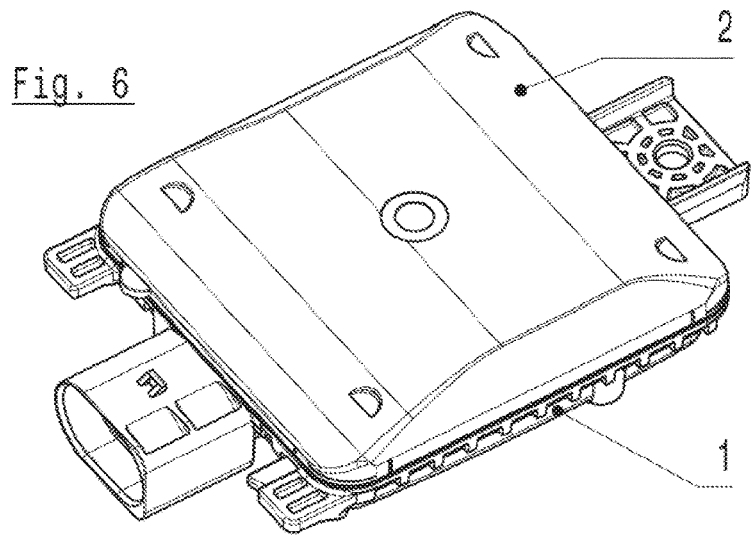
FIG. 6 is the entire radar device.
Figure 7:
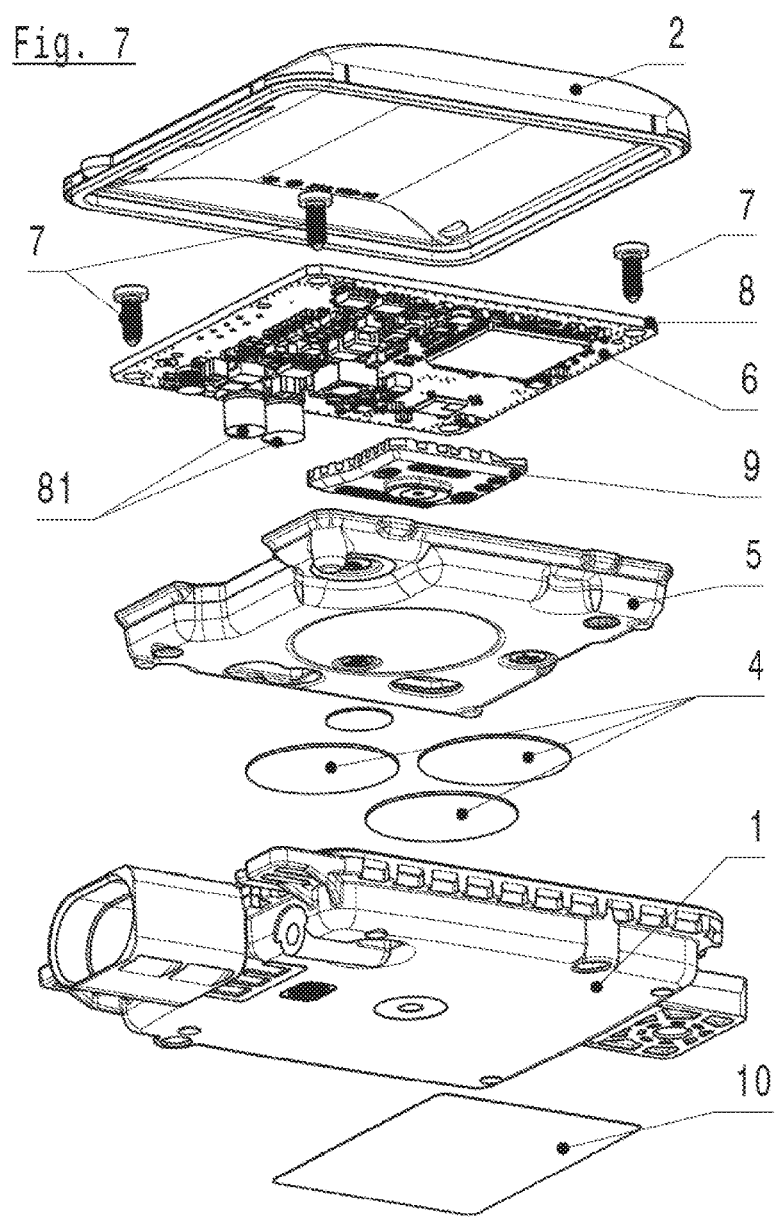
FIG. 7 is a first exploded drawing of the entire radar device.
Figure 8:
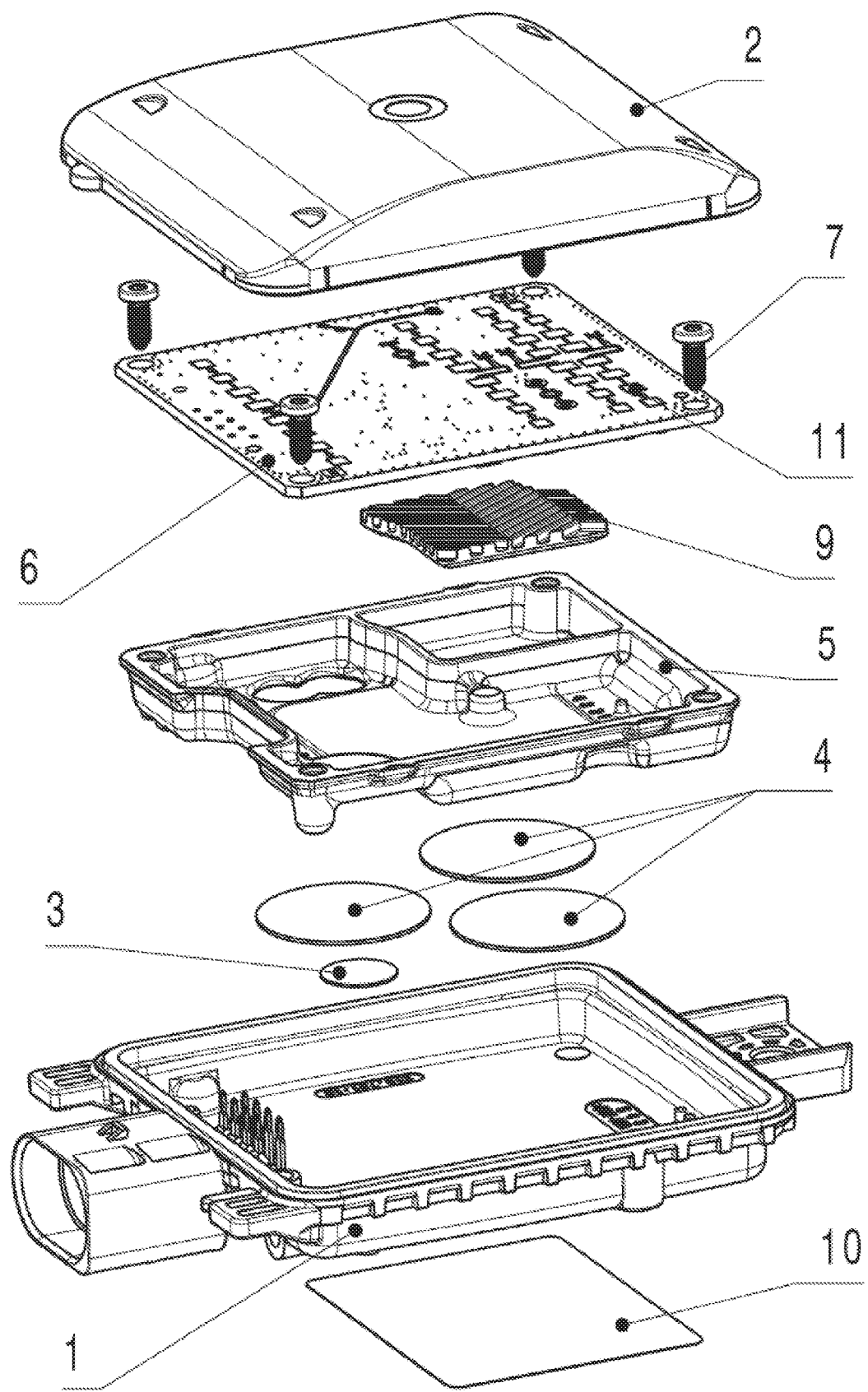
FIG. 8 is a second exploded drawing of the entire radar device.

The inventive radar device has a two-piece housing 1, 2. The housing 1, 2 has the lower part of the housing I with a plastic device connector (it is advantageous if this is molded on) and a radome 2 as the upper part of the housing.

The lower part of the housing 1 is provided with a hole that is sealed using a diaphragm 3. The diaphragm 3 is permeable, which creates pressure equalization between the interior of the housing and the surroundings of the housing 1, 2. A label 10 can be attached to the outside of the lower part of the housing.

It is also possible to put ribs on the outside of the lower part of the housing that act as cooling fins.

For example, three bonding points 4 are used to fasten the shield 5 made of aluminum or some other metal in the lower part of the housing 1. The fastener is chosen so as to establish good heat transfer between the shield and the lower part of the housing. Heat transfer can be improved, for example, by using thermally conductive paste or gap filler. The shield 5 is manufactured through die casting (die-cast aluminum). Instead of a shield that is manufactured entirely from metal, it is also possible to use a plastic part with at least one metal layer and a plastic part with embedded metal parts or metal particles. The shield 5 is designed like a tub, so it has an interior. This interior area is partitioned by fillets 51. As a result of this partitioning of the interior space and in conjunction with the bottom side of the interconnect device 6, which is mounted on the shield 5 with screws 7, two chambers 52, 53 are formed: one for high-frequency components and one for low-frequency components. The high-frequency components and low-frequency components are arranged on the bottom side of the interconnect device 6, form a circuit arrangement 8 and protrude into the chambers 52, 53. Chamber 53 for high-frequency components not only has components protruding into it, but also has an absorbing body 9 made of radar-absorbing plastic arranged within it. It is advantageous for the absorbing body 9 to be glued to the lower part of the housing 1. It is advantageous for the connection to be designed so as to establish good heat transfer between the absorbing body 9 and the lower part of the housing 1.

In principle, it is possible to manufacture the lower part of the housing 1 and the shield 5 as a single part. Such a part 1, 5 could be composed of multiple components or be designed as one piece, for example, as a plastic part with embedded metal particles.

The shield 5 has a hole 54 that resembles a figure eight. Two adjacently arranged electrolytic capacitors 81 of the circuit arrangement 8 protrude into this hole 54.

On a second side of the interconnect device 6 there are antennas 11; these are transmitter antennas and receiver antennas provided by conductor paths and other metal structures. These antennas 11 are covered by the radome 2.

REFERENCE NUMERAL LIST

1 Lower part of the housing
2 Upper part of the housing/radome
3 Diaphragm
4 Bonding points
5 Shield
51 Fillets
52 Chamber
53 Chamber
54 Hole
6 Interconnect device
7 Screws
8 Circuit arrangement
81 Electrolytic capacitors
9 Absorbing body
10 Label
11 Antennas

The invention claimed is:

1. A radar device comprising:
 a housing including an upper part of the housing provided in a form of a radome and a lower part of the housing;
 a first side of a shield including at least two chambers, wherein the shield has a hole shaped like a figure eight;
 at least two electrolytic capacitors adjacently arranged on a first side of an interconnect device, wherein the at least two electrolytic capacitors are designed to protrude through the hole;
 an absorbing body arranged within one of the at least two chambers of the shield;
 antennas arranged on a second side of the interconnect device,
 wherein the first side of the shield is adjacent to the first side of the interconnect device and the shield and the interconnect device with electronic components and the antennas arranged on the second side of the interconnect device are covered by the radome, and
 wherein the second side of the shield is adjacent to the lower part of the housing.

2. The radar device in accordance with claim 1, wherein the electronic components further comprise an MMIC, the MMIC being among the electronic components arranged on the first side of the interconnect device.

3. A radar device comprising:
 a housing comprising an upper part and a lower part, wherein the upper part of the housing includes a radome;
 a shield with at least two chambers and a hole shaped like a figure eight;
 an interconnect device comprising a first side facing the lower part and a second side opposite the first side;
 electronic components arranged on the first side of the interconnect device including at least two electrolytic capacitors, wherein the electrolytic capacitors are configured to protrude through the hole in the shield to reduce the height of the radar device; and
 antennas arranged on the second side of the interconnect device,
 wherein the antennas are arranged between the shield and the radome,
 wherein the radome is in direct communication with the second side of the interconnect device, and
 wherein a first side of the shield is in direct communication with the first side of the interconnect device and a second side of the shield is in direct communication with the lower part of the housing.

4. The radar device in accordance with claim 3, wherein the shield has an interior area partitioned by fillets, wherein the interior area is configured to accommodate the first side of the interconnect device.

5. The radar device in accordance with claim 3, wherein the antennas include one or more of transmitter antennas and receiver antennas.

6. The radar device according to claim 3, further comprising an electronic circuit arrangement arranged on the first side of the interconnect device.

7. The radar device according to claim 3, wherein the antennas are projecting upward toward the radome.

8. The radar device according to claim 3, wherein the shield is retained and secured within a lower part of the housing.

9. A radar device comprising:
   a housing including an upper part and a lower part, wherein the upper part of the housing is provided in a form of a radome;
   a shield secured to the lower part of the housing, wherein the shield has a hole shaped like a figure eight and at least two chambers;
   an interconnect device with electronic components arranged on a first side, wherein the electronic components include at least two adjacently positioned electrolytic capacitors arranged to protrude through the hole in the shield to reduce the height of the radar device; and
   antennas arranged on a second side of the interconnect device, wherein the antennas are located between the shield and the radome.

10. The radar device according to claim 9, wherein the radome is in direct communication with the antennas.

11. The radar device according to claim 9, wherein the shield is configured to cover the second side of the interconnect device.

\* \* \* \* \*